United States Patent
Kawakami et al.

[11] Patent Number: 5,919,589
[45] Date of Patent: Jul. 6, 1999

[54] RECHARGEABLE BATTERY

[75] Inventors: Soichiro Kawakami; Naoya Kabayashi, both of Nara; Masaya Asao, Tsuzuki-gun, all of Japan

[73] Assignee: Canon Kabushiki Kaisha, Tokyo, Japan

[21] Appl. No.: 08/812,307

[22] Filed: Mar. 5, 1997

[30] Foreign Application Priority Data

Mar. 5, 1996 [JP] Japan .................................. 8-073080

[51] Int. Cl.⁶ .................................................. H02M 4/36
[52] U.S. Cl. ..................... 429/231.8; 429/232; 29/623.1; 423/445 R
[58] Field of Search ........................ 423/445 R; 429/218, 429/232, 231.8; 252/502, 504; 29/623.1

[56] References Cited

U.S. PATENT DOCUMENTS

| | | | |
|---|---|---|---|
| 4,020,248 | 4/1977 | Goebel | 429/218 X |
| 4,221,773 | 9/1980 | Tsukagoshi et al. | 423/445 |
| 4,550,015 | 10/1985 | Korb et al. | 423/445 |
| 4,758,473 | 7/1988 | Herscovici et al. | 429/232 X |
| 4,847,021 | 7/1989 | Montgomery et al. | 423/445 X |
| 5,482,797 | 1/1996 | Yamada et al. | 429/232 X |
| 5,626,977 | 5/1997 | Mayer et al. | 429/44 |

FOREIGN PATENT DOCUMENTS

| | | |
|---|---|---|
| 62-122066 | 6/1987 | Japan . |
| 2-066856 | 3/1990 | Japan . |
| 3-245473 | 11/1991 | Japan . |
| 3-252053 | 11/1991 | Japan . |
| 5-290844 | 11/1993 | Japan . |
| 6-084516 | 3/1994 | Japan . |

OTHER PUBLICATIONS

A. N. Dey et al., "The Electrochemical Decomposition of Propylene Carbonate on Graphite", J. Electrochem. Soc. vol. 117, No. 2, (1970) (Feb.) pp. 222–224.
Denki Kagaku, Electrochemistry, vol. 57, p. 614 (1989), (Month Unknown).
Abstract of the 34th Symposium on Battery (in Japan), p. 77 (1993) (Month unknown).
Abstract of the 33rd Symposium on Battery (in Japan), p. 217 (1993) (Month Unknown).
Abstract of the 58th Annual Meeting of the Electrochemistry Society, p. 158 (1991), (month unknown).

*Primary Examiner*—Stephen Kalafut
*Attorney, Agent, or Firm*—Fitzpatrick, Cella, Harper & Scinto

[57] ABSTRACT

Disclosed is a rechargeable battery comprising an anode, a separator, a cathode, an electrolyte, and a battery housing accommodating the members, the battery being of a type utilizing intercalating and deintercalating reactions of lithium ions as charging and discharging reactions of the battery. The anode comprises a host material for allowing lithium ions to intercalate therein upon conducting the charging, and the host material comprises a carbonous material containing a crystalline portion in which a graphite structure is developed and an amorphous portion in which the graphite structure is not developed. The crystalline portion and the amorphous portion of the carbonous material exhibit two or more of peaks in a region of $2\theta=22-27°$ based on the (002) face on a chart obtained by X-ray wide angle diffraction using CuK $\alpha$-rays.

24 Claims, 4 Drawing Sheets

RECHARGEABLE BATTERY

BACKGROUND OF THE INVENTION

1. Field of the Invention

The present invention relates to a rechargeable battery utilizing intercalating and deintercalating reactions of lithium ions as charging and discharging reactions of the battery, and particularly to a rechargeable lithium battery having a large electric capacity, which employs a carbonous material as an anode.

2. Related Background Art

In recent years, the warming of the earth because of the so-called greenhouse effect due to an increase of atmospheric $CO_2$ has been predicted. For example, in thermal electric power plants, thermal energies obtained by burning a fossil fuel such as coal or petroleum are being converted into electric energies, and along with burning such a fuel, a large amount of $CO_2$ gas is being exhausted in the air; accordingly, in order to suppress the above earth-warming phenomenon, there is a tendency to prohibit the establishment of new thermal electric power plants. Under such circumstances, so-called load leveling practice has been proposed in order to effectively utilize the electric power generated by power generators in thermal electric power plants or the like. According to this practice, surplus power unused in the night is stored in rechargeable batteries installed at general houses and the power thus stored is used in the daytime when the demand for power increases, whereby the power consumption is leveled.

In the application of electric vehicles which do not exhaust any air polluting substances including COx, NOx and CH, there is an increased demand for developing a high performance rechargeable battery with a high energy density. Also, in the application of portable instruments such as small personal computers, word processors, video cameras, and pocket telephones, there is an increased demand for developing a miniature, lightweight, and high performance rechargeable battery.

As for the above miniature, lightweight and high performance rechargeable battery, one example using a lithium-graphite intercalation compound as an anode of a rechargeable battery has been reported in JOURNAL OF THE ELECTROCHEMICAL SOCIETY 117, 222 (1970), and since then, various rocking chair type rechargeable batteries, so-called "lithium ion batteries" have been developed and practically used in part, in which a carbonous material is used as an anode material and an intercalation compound introduced with lithium ions is used as a cathode material wherein lithium ions are stored in a state being intercalated between layers of the carbonous material upon conducting the charging reaction of the battery. More specifically, in such a lithium ion battery, a carbonous material functioning as a host material for allowing lithium ions to intercalate between layers thereof as a host is used as an anode, to suppress the dendrite growth of lithium upon conducting the charging of the battery, thereby prolonging the cycle life of the charging and discharging cycle.

In order to further prolong the cycle life of rechargeable batteries of this type, proposals and studies have been extensively made to further improve carbonous materials used for anodes of the batteries. In general, carbonous materials usable for the above anodes, which are capable of storing lithium upon conducting the charging, are classified into difficult-to-graphitize carbonous materials (i.e., materials obtained by sintering and carbonizing a resin which contains many amorphous components and is easily graphitized) and graphite series materials.

Japanese Unexamined Patent Publication No. 122066/1987 discloses a rechargeable battery using, as an anode of a type utilizing intercalating/deintercalating phenomenon of ions of an alkali metal, a carbonous material having an atomic ratio of hydrogen/carbon in a range of less than 0.15, a spacing between the (002) faces in a range of 0.337 nm (nanometer) or more, and a magnitude of a crystallite along the c-axis in a range of 15 nm or less.

Japanese Unexamined Patent Publication Nos. 66856/1990 and 252053/1991 disclose a rechargeable battery (nonaqueous electrolyte solution type rechargeable battery such as lithium battery) using, as an anode, a carbonous material having a spacing between the (002) faces in a range of 0.370 nm or more, a true density in a range of less than 1.70 $g/cm^3$, and a specific property having no heat generation peak at a temperature of 700° C. or more as a result of a differential thermal analysis conducted in an air flow.

Japanese Unexamined Patent Publication No. 245473/1991 discloses a rechargeable battery (nonagueous electrolyte solution type rechargeable battery such as a lithium battery) using, as an anode, a carbonous material having a spacing between the (002) faces in a range of from 0.33 nm to 0.35 nm, a magnitude of a crystallite along the c-axis in a range of from 5 nm to 20 nm, and a magnitude of a crystallite along the a-axis in a range of from 10 nm to 40 nm.

Japanese Unexamined Patent Publication No. 290844/1993 discloses a rechargeable battery using, as an anode, a mixture of natural graphite and synthetic graphite, and Japanese Unexamined Patent Publication Nd. 84516/1994 discloses a rechargeable battery using, as an node, graphite having the surface covered with an amorphous carbon layer or a coke layer.

Other than the above examples, there have been reported various kinds of carbonous materials applied to anodes of batteries: for example, carbon fibers [Denki Kagaku (Electrochemistry), Vol. 57, p614 (1989)]; mesocarbon microbeads [Abstract of the 34th Symposium on Battery (in Japan), p77 (1993)]; natural graphite [Abstract of the 33rd Symposium on Battery (in Japan), p217 (1992)]; graphite whiskers [Abstract of the 34th Symposium on Battery (in Japan), p77 (1993)]; and sintered body of furfuryl alcohol resin [Abstract of the 58th Annual Meeting of Electrochemistry of Society, p158 (1991)].

However, as for the above difficult-to-graphitize carbon series material, particularly, used as an anode of a rechargeable battery utilizing intercalating and deintercalating reactions of lithium ions as the charging and discharging reactions, although there has been developed a carbonous material exhibiting an electric capacity over a theoretical capacity of graphite (372 mAh per 1 g of carbon, this theoretical capacity meaning the fact that one lithium atom is stored per six carbon atoms) at the beginning of the charging, the carbonous material has a problem that the electric capacity has a value lower than the theoretical capacity after the repetition of the charging and discharging cycle by several tens or several hundreds times. On the other hand, as for the above graphite series carbonous material, particularly, used as an anode of a rechargeable battery using intercalating and deintercalating reactions of lithium ions as the charging and discharging reactions, there has not been developed a carbonous material exhibiting an electric capacity over the theoretical capacity of graphite. Accordingly, there is a strong demand for developing a lithium battery using a carbonous material as an anode, which can be increased in electric capacity and improved in cycle life.

SUMMARY OF THE INVENTION

In view of the foregoing, the present invention has been made, and an object of the present invention is to provide a rechargeable battery utilizing intercalating and deintercalating reactions of lithium ions as charging and discharging reactions of the battery, comprising an anode made of a carbonous material, which enables the battery to have an increased electric capacity, prolonged cycle life, and enhanced charging/discharging efficiency.

To attain the above object, according to the present invention, there is provided a rechargeable battery comprising an anode, a separator, a cathode, an electrolyte, and a battery housing accommodating these members, the battery being of a type utilizing intercalating and deintercalating reactions of lithium ions as the charging and discharging reactions, wherein said anode comprises a host material for allowing lithium ions to intercalate therein upon conducting the charging, and the host material is comprised of a carbonous material containing a crystalline portion in which a graphite structure is present and an amorphous portion in which the graphite structure is not present, the crystalline portion and the amorphous portion of said carbonous material exhibiting two or more of peaks in a region of $2\theta=22-27°$ based on the (002) face on a chart obtained by X-ray wide angle diffraction using CuK$\alpha$-rays.

It is to be noted that in the present invention (or the present specification), a rechargeable battery utilizing intercalating and deintercalating reactions of lithium ions as charging and discharging reactions of the battery is hereinafter referred to as "a rechargeable lithium battery" including the so-called "lithium ion battery".

DESCRIPTION OF THE INVENTION AND PREFERRED EMBODIMENTS

Figure 1:
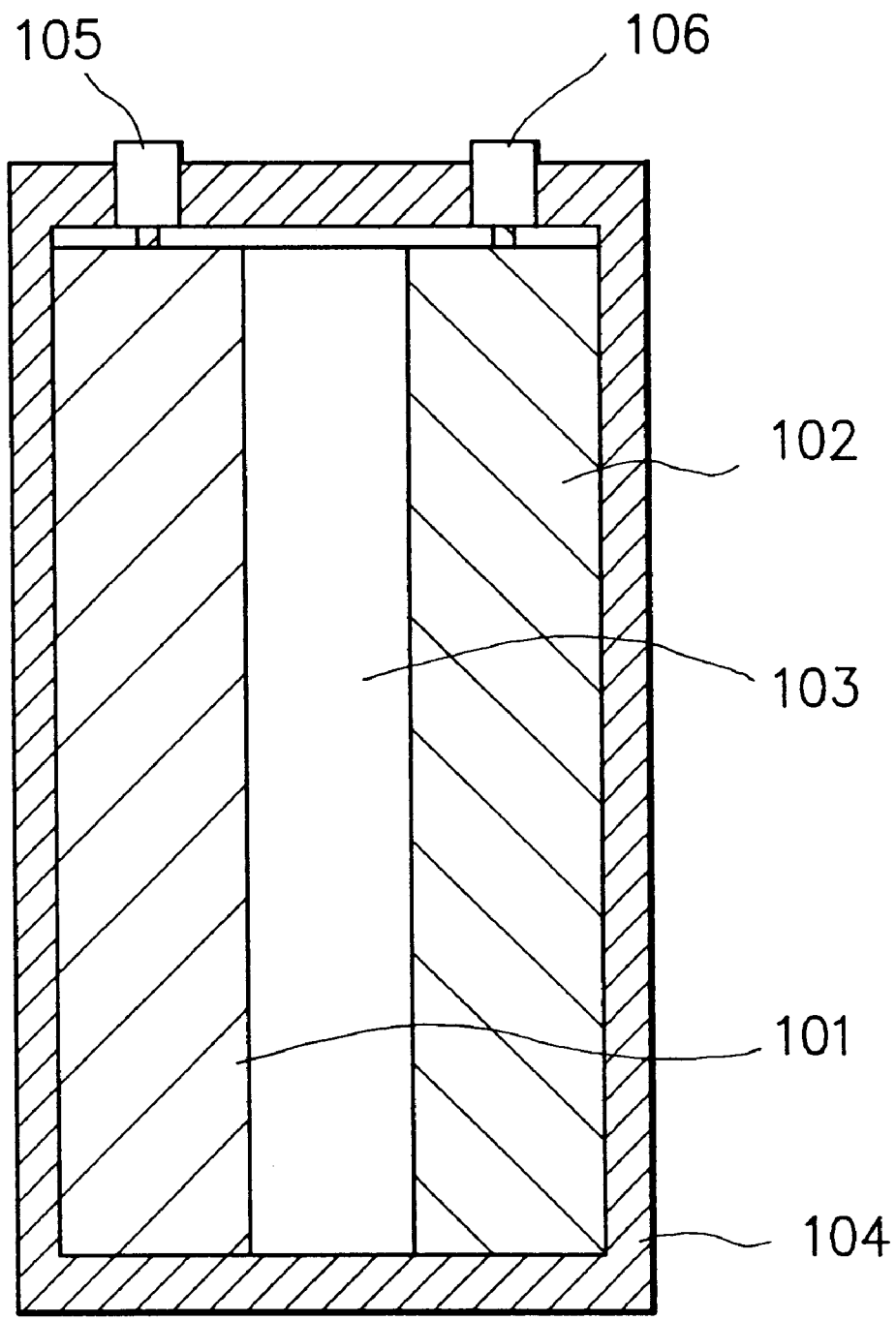
FIG. 1 is a schematic sectional view showing one example of a rechargeable lithium battery of the present invention.

Hereinafter, the present invention will be described in detail with reference to the accompanying drawings.

A rechargeable battery of the present invention of a type utilizing intercalating and deintercalating reactions of lithium ions as charging and discharging reactions of the battery, is characterized in that an anode comprises a host material for allowing lithium ions to intercalate therein upon conducting the charging, said host material being comprised of a carbonous material exhibiting two or more of peaks in a region of $2\theta=22-27°$ based on the (002) face on a chart obtained by X-ray wide angle diffraction using CuK$\alpha$-rays.

In the present invention, as described above, an anode comprises a host material for allowing lithium ions to intercalate therein upon conducting charging and said host material is comprised of a carbonous material containing a crystalline portion in which a graphite structure is developed and an amorphous portion in which the graphite structure is not developed, the crystalline portion and the amorphous portion of said carbonous material exhibiting two or more of peaks in a range of $2\theta=22-27°$ based on the (002) face on a chart obtained by X-ray wide angle diffraction using CuK$\alpha$-rays; and accordingly, the carbonous material is higher in electric conductivity than a difficult-to-graphitize carbonous material, thereby making it possible to easily elute, by discharging, lithium deposited at portions other than the crystal layers of the carbonous material, and to mitigate a strain generated due to expansion upon conducting charging by the amorphous portion. As a result, the anode made of such a carbonous material allows a large amount of lithium to be stored with a high reversibility. Thus, it becomes possible to realize a rechargeable lithium battery with an increased electric capacity and a prolonged cycle life by the use of such an anode.

In the carbonous material used as the host material for the anode of the rechargeable battery of the present invention, the content of carbon is preferably in an amount of from 70 to 99 wt %.

In the rechargeable battery of the present invention, by the addition of one or more kinds of elements selected from a group consisting of oxygen, nitrogen, sulfur, and hydrogen into the carbonous material constituting the anode, it is possible to easily create coordination of lithium ions upon conducting charging of the battery, and hence to increase the charged amount. Since each of oxygen, nitrogen, and sulfur is larger in electronegativity than carbon, the carbonous material containing such an element is liable to entrap lithium, and since hydrogen is combined with radicals generated during the production steps and hence eliminates the radicals, it is possible to reduce the reactivity of the carbonous material with the electrolyte. As a result, there can be realized a rechargeable lithium battery which is further increased in electric capacity.

In the rechargeable battery of the present invention, as the carbonous material for the anode, containing a crystalline portion in which a graphite structure is developed and an amorphous portion in which the graphite structure is not developed, the crystalline portion and the amorphous portion of the carbonous material exhibiting two or more of peaks in range of $2\theta=22-27°$ based on the (002) face on a chart obtained by X-ray wide angle diffraction using CuK$\alpha$-rays, there can be preferably used a carbonous material obtained by dispersing a powder of graphite having an average particle size of from 0.1 to 10 $\mu$m in an organic polymer material, and baking the resultant in an inert gas or under a reduced pressure at a temperature of from 600 to 1500° C., whereby carbonizing the organic polymer material containing graphite. The anode constituted by at least such a carbonous material makes it possible to realize a rechargeable lithium battery with an increased electric capacity and a prolonged cycle life at a low cost.

As the carbonous material constituting the anode of the rechargeable battery of the present invention, there can be also used a carbonous material obtained by dispersing a powder of graphite having an average particle size of from 0.1 to 10 $\mu$m in a monomer solution as a source material of the above organic polymer material, polymerizing the monomer, and baking the organic polymer material thus polymerized in an inert gas or under a reduced pressure at a temperature of from 600 to 1500° C., whereby carbonizing the organic polymer material containing graphite. In a preferred embodiment, as the above graphite added in the organic polymer material or monomer as the source material of the carbonous material, there can be adopted powdery graphite obtained by mixing graphite with an compound for forming an intercalation compound with the graphite, expanding the graphite by the reaction therebetween, and cleaving the resultant graphite by irradiating an energy such as an ultrasonic wave energy. The use of the powdery graphite thus obtained makes it possible to prepare a carbonous material in which the graphite structure is developed. The reason for this is that the graphite is finely crushed by a grinder before mixing of the graphite, it can be more uniformly dispersed in the above organic polymer material or monomer, and thereby the graphitization can be more uniformly developed in the baking step.

In another preferred embodiment, by the addition of a material capable of generating $CO_2$ gas by thermal decomposition into the organic polymer material dispersed with graphite, it becomes possible to obtain a carbonous material having micro-pores by baking. Such a carbonous material can be desirably used for the anode of the rechargeable battery of the present invention. More specifically, the anode prepared using the carbonous material developed in pores enables adequate permeation and retention of an electrolyte solution, and accordingly, it can realize a rechargeable lithium battery which is high in charging/discharging efficiency even when the charging is carried out at a large current.

Hereinafter, the embodiment of the present invention will be described with reference to FIG. 1.

FIG. 1 is a schematic sectional view showing the configuration of one example of a rechargeable lithium battery of the present invention. The rechargeable lithium battery includes an anode 101, a cathode 102, and an electrolyte (or electrolyte solution)/separator 103. In FIG. 1, reference numeral 105 indicates a terminal of the anode; 106 is a terminal of the cathode; and 104 is a battery housing (battery jar).

Figure 2:
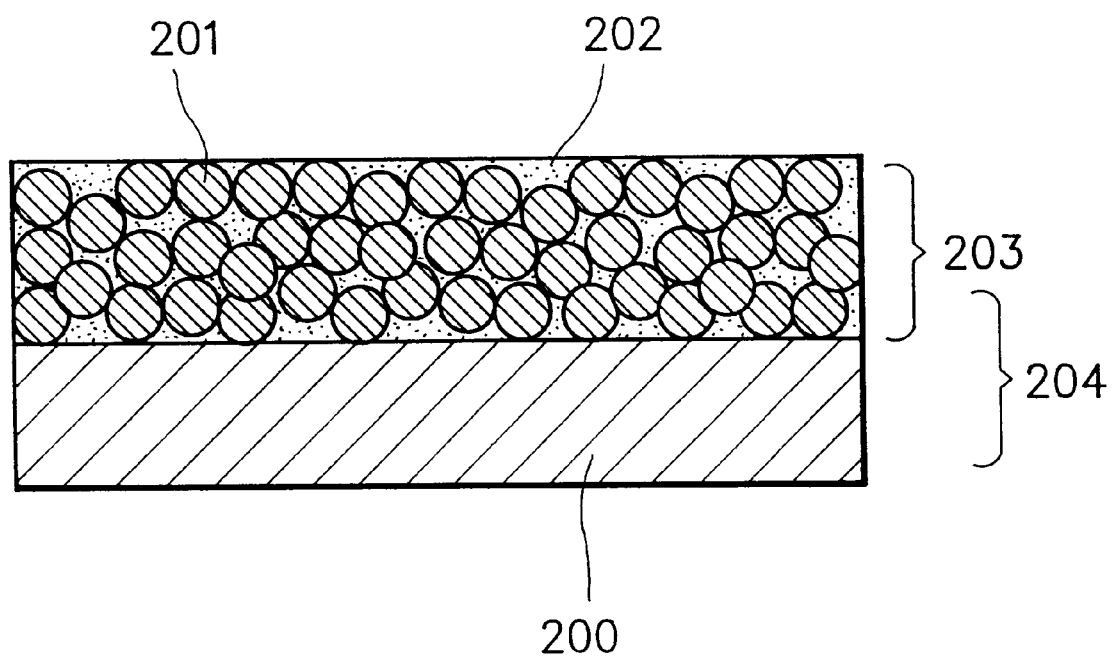
FIG. 2 is a schematic sectional view showing one example of an anode used for the rechargeable lithium battery of the present invention.

FIG. 2 is a schematic sectional view of one example of an anode used for the rechargeable lithium battery of the present invention. The anode of the present invention includes an anode collector 200, a carbonous material 201 for the anode, and a binding agent 202. The anode 204 is obtained by forming an anode (active material) layer 203 on the surface of the anode collector 200 using a mixture of the carbonous material 201 and the binding agent 202. The anode (active material) layer may be suitably added with an electric conduction assisting material.

In the present invention, the term "active material" means a material related to the repetition of the electrochemically reversible reactions (charging and discharging reactions) of the battery, and it also means a material which is related to the above reactions and simultaneously takes a role to retain a different material related to the above reactions. In the rechargeable lithium battery, lithium as the anode active material is retained on the anode side upon conducting the charging and becomes ions of lithium ion the electrolyte side upon conducting the discharging.

The anode 204 having the configuration shown in FIG. 2 can be prepared, for example, in the following procedures (1) and (2).

(1) A powder of a carbonous material is mixed with a binder, and the resultant mixture is added with a solvent so as to adjust the viscosity, to prepare a paste-like product.

(2) The paste-like product is applied on the anode collector, followed by drying, to form an anode. In this case, the paste-like product is adjusted in thickness by roll-pressing, as needed.

The paste-like product can be applied on the anode collector by, for example, a coater coating process, or a screen printing process.

As the binding agent used for formation of the anode, there may be used a polyolefin resin such as polyethylene or polypropylene, or a fluorine-containing resin such as poly (vinylidene fluoride) or polytetrafluoroethylene.

(Preparation of Carbonous Material for Anode and Anode)

Hereinafter, a process for the preparation of a carbonous material for an anode (such as the anode 204 in FIG. 2) of the rechargeable battery of the present invention and the anode will be described in detail in the following procedures (1) to (4).

(1) An organic polymer material solution is first prepared by adding a solvent to an organic polymer material capable of being carbonized by baking. A fine powder of graphite is dispersed in the organic polymer material solution, followed by the addition of a material capable of generating $CO_2$ gas by thermal decomposition as needed, and the resultant solution is dried to remove the solvent, to thereby obtain an organic polymer material dispensed with a fine powder of graphite.

(2) The organic polymer material dispensed with a fine powder of graphite is baked in the flow of an inert gas such as nitrogen gas or argon gas or under a reduced pressure so as to be carbonized, whereby forming a carbonous material.

(3) The carbonous material is ground, to obtain a powder of the carbonous material.

(4) The powdery carbonous material is mixed with a binding agent, and if necessary, added with an electric conduction assisting agent, followed by the addition of a solvent, to prepare a paste-like product. The paste-like product is applied on the anode collector, followed by drying, to thereby prepare an anode.

The added amount of the graphite in the procedure (1) is preferably in a range of from 1 to 20 wt %, more preferably, in a range of from 2 to 10 wt %.

In the procedure (1), the organic polymer material may be replaced with a material obtained by dispersing a fine powder of graphite in a solution of a monomer as a source material of the organic polymer material, polymerizing the monomer, whereby obtaining a desired organic polymer material.

As the material capable of generating $CO_2$ gas in the procedure (1), there can be used one or more kinds of carboxylic acids selected from citric acids and oxalic acids.

The paste-like product may be applied on the anode collector by a coater coating process or a screen printing process.

Other than the above process, an anode can be formed by a manner of directly applying the organic polymer material dispersed with graphite obtained in the procedure (1) on the anode collector, carbonizing the resultant by baking, and reducing the oxidized anode collector.

As a result of X-ray wide angle diffraction using $CuK\alpha$-rays, the carbonous material obtained in the procedure (3) is found to have two or more of peaks in a range of $2\theta=22-27°$. That is to say, it is recognized from the chart of the x-ray diffraction that the diffraction line of the (002) face of a crystalline portion in which a graphite structure is developed appears as a sharp peak (half value width $\leq 2°$) at a point near $2\theta=26.5°$ (specifically in a range of $25.7°$ to $26.7°$) and the diffraction line of the (002) face of an amorphous portion in which the graphite structure is not developed appears as a broad peak [as compared with the peak appearing at the point near $2\theta=26.5°$ (half value width $\geq 8\%$)] of a point near $2\theta=22°-25°$.

The ratio of intensity in the sharp peak at the point near $2\theta=26.5°$ to the broad peak at the point near $2\theta=22-25°$ is preferably in a range of ⅓ to 1.

As a result of the measurement of the carbonous material in terms of Raman scattering, there can be observed a peak due to the graphite structure at a point near 1580 cm$^{-1}$ (specifically, in a range of 1580–1590 cm$^{-1}$) and a peak due to the amorphous carbon at a point near 1360 cm$^{-1}$ (specifically in a range of 1340–1360 cm$^{-1}$). The content of carbon in the carbonous material used for the anode of the rechargeable lithium battery of the present invention may be in a range of from 70 to 99 wt %, particularly, in a range of from 80 to 95 wt %.

(Introduction of Oxygen, Nitrogen, Sulfur and/or Hydrogen) into Carbonous Material for Anode Elements selected from a group consisting of oxygen, nitrogen, sulfur and hydrogen can be introduced in a carbonous material used for the anode by the use of an organic polymer material or a monomer material containing the elements as a starting material of the carbonous material. The use of such a carbonous material is effective to improve the performance of the anode. Moreover, the carbonous material prepared can be heated in an atmosphere containing hydrogen gas at a temperature of 200° C. or more, or irradiated with a hydrogen plasma generated by glow discharge so as to decrease dangling bonds in the carbonous material.

The content of the elements selected from a group consisting of oxygen, nitrogen, sulfur and hydrogen in the carbonous material constituting the anode of the rechargeable battery of the present invention is preferably in a range of from 0.2 to 20 atomic %, more preferably, in a range of from 1 to 10 atomic %. When the content is excessively larger, the graphite structure of the carbonous material do not develop at all. The content of the halogen element is identified based on absorption peak of C—H stretching vibration in the infrared absorption spectrum measurement. The content of the carbon element and the above elements except the halogen element is identified based on SIMS.

(Organic polymer material or Monomer Used for Preparation of Carbonous Material for Anode)

Description will be made of an organic polymer material or monomer used for preparation of the carbonous material used for the anode of the rechargeable battery of the present invention. Specific examples of the organic polymer material as a source material of the carbonous material include polyvinyl alcohol, polyfurfuryl alcohol, polyvinyl acetate, polyacrylonitrile, polyparaphenylene, polyparaphenylene sulfide, polyparaphenylene vinylene, polythienylene, polydithienyl polyene, polyvinylnaphthalene, polyvinyl chloride, polyaniline, polypyrrol, furan resin, and silicon resin.

The above organic polymer material used for the formation of the carbonous material may be baked in an inert gas such as a nitrogen atmosphere or under a reduced pressure at a temperature of from 600 to 1500° C., preferably, in a range of 700 to 1200° C. The higher the baking temperature, easier the growth of the graphite structure.

(Powdery Graphite Used for Preparation of Carbonous Material for Anode)

A powdery graphite used for forming the carbonous material of the anode is prepared in the following procedures (1) to (3).

(1) Natural graphite or synthetic graphite is mixed with a compound for forming an intercalation compound with the graphite, and the graphite is expanded by the reaction therebetween. The mixture thus expanded is dispersed in a solvent, and is cleaved by irradiation of an energy such as an ultrasonic wave energy.

(2) The powdery graphite is neutralized, rinsed, and dried under a reduced pressure.

(3) The resultant powdery graphite is further ground in an inert gas, to obtain a fine powder of graphite.

The average particle size of the fine powder of graphite prepared in the procedure (3) may be in a range of from 0.1 to 10 μm, preferably, in a range of from 0.1 to 5 μm. When the average particle size is excessively larger, the graphite cannot be uniformly dispersed in the organic polymer material.

As the compound for forming an intercalation compound with the graphite, there may be used an acid, halogen element, or a metal halide. Specific example of the acid include $HNO_3$, $H_2SO_4$, $HClO_4$, $H_3PO_4$, and $HAuCl_4$.

Specific examples of the halogen element include $Br_2$, $ICl$, $IBr$, $I_2$, and $Cl_2$, and specific examples of the metal halide include $CuCl_2$, $MgCl_2$, $ZnCl_2$, $AlCl_3$, $AlBr_3$, $InCl_3$, $TiF_4$, $AsF_5$, $SbCl_5$, $SbF_5$, $PF_5$, $MoCl_5$, $MoF_6$, $WCl_6$, $WF_6$, $MnCl_2$, $FeCl_2$, $FeBr_3$, $CoCl_2$, $NiCl_2$, and $PtCl_2$.

Other than the above process for the preparation of a fine powder of graphite, there may be adopted a process for inserting a monomer having a polarity group in a support material made of an ion exchange type layer-structured crystalline material or a molecular type layered crystalline material, polymerizing the monomer inserted in support material, baking the organic polymer material thus obtained, and dissolving the support material after baking.

More specifically, in the case of using the ion exchange type layer-structured crystalline material as a support material, a monomer is inserted in a powder of montmorillonite, and is polymerized by heating or irradiation of γ-rays, X-rays or electron rays. The monomer is inserted in the powder of montmorillonite by dispersing the powder of montmorillonite in a solution in which the monomer is dissolved in a solvent such as toluene by bringing the monomer in a vapor phase in contact with the montmorillonite under a reduced pressure. In the case of insertion of a monomer into the powdery support in a solution, a polymerization initiator can be mixed in the solution before initiation of the polymerization. The polymer obtained by the polymerization of the monomer is baked in an inert gas, to be carbonized. The baking temperature may be in a range of from 600 to 1500° C. The graphitization is made easy as the baking temperature is increased. In some polymers, the graphitization thereof is made easy by previously oxidizing the polymer in an air or steam before baking. In the case of using an ion exchange type layered crystalline material such as a clay mineral, the crystalline material is removed by etching using hydrofluoric acid after graphitization, to obtain a fine powder of graphite.

Specific examples of the ion exchange type layered crystalline material include silicates such as montmorillonite, taeniolite, vermiculite, and beidellite; titanates such as $Na_2Ti_3O_7$, $KTiNbO_5$, and $Rb_xMn_xTi_{2-x}O_4$; vanadates such as $KV_3O_8$, $K_3V_5O_{14}$, $CaV_6O_{16} \cdot nH_2O$, and $Na(UO_2V_3O_9) \cdot nH_2O$; phosphates such as $Zr(HPO_4) \cdot nH_2O$, $Ti(HPO_4)_4 \cdot nH_2O$, and $Na(UO_2PO_4) \cdot nH_2O$; tungstates such as $Na_2W_4O_{13}$, and $Ag_6W_{10}O_{33}$, and molybdates such as $Mg_2Mo_2O_{17}$, $Cs_2Mo_5O_{16}$, $Cs_2Mo_7O_{22}$, and $Ag_6Mo_{10}O_{33}$.

Specific examples of the molecular type layer-structured crystalline material include silicates such as kaolinite, halloysite, $H_2Si_2O_5$, and $H_2Si_{14}O_{29} \cdot 5H_2O$; and chalcogen compounds such as $TiS_2$, $NbSe_2$, $MoS_2$, $Ta_2S_2C$, $MPS_3$ and $MPSe_3$ (M: metal).

(Cathode)

A cathode (such as the cathode 102 in FIG. 1) used in the rechargeable battery of the present invention includes a cathode collector, a cathode active material, an electric conduction assisting material, and a binding agent. The cathode is prepared, for example, by forming a mixture of the cathode active material, electric conduction assisting material, and a binding agent on the surface of the cathode collector.

The electric conduction assisting material used in the cathode can include graphite, carbon black such as ketjen black or acetylene black, and fine powders of metals such as nickel.

Specific examples of the binding agent, for example, include polyolefins such as polyethylene and polypropylene; and fluorine-containing resins such as poly (vinylidene fluoride) and tetrafluoroethylene polymer.

As the cathode active material, there is usually used a compound selected from a group consisting of transition metal oxides, transition metal sulfides, lithium-transition metal oxide and lithium-transition sulfides. The transition metal elements of the transition metal oxides and transition metal sulfides can include elements partially having a d-shell or f-shell. Specific examples of such elements include Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au. Of these elements, Ti, V, Cr, Mn, Fe, Co, Ni, and Cu as the first transition series metals are the most appropriate.

(Collector for Anode and Cathode)

The anode and cathode in the rechargeable battery of the present invention can be constituted by forming an anode (active material) layer and a cathode (active material) layer on respective collectors. Such a collector serves to supply an electric current such that it can be efficiently consumed for the battery reaction upon conducting the charging and discharging and to collect an electric current generated. The collector is therefore desired to be constituted by a material which has a high electric conductivity and is inactive to the battery reaction.

The material of the collector can include Ni, Ti, Cu, Al, Pt, Pd, Au, Zn, and alloys of two or more of these metals such as stainless steel. The collector may be formed in the shape of plate, foil, mesh, sponge, fiber, punching metal, or expanded metal.

(Separator)

A separator (such as the separator 103, in FIG. 1) used in the rechargeable battery of the present invention is disposed between the anode and cathode for preventing them from suffering from internal-shorts. In addition, the separator serves to retain an electrolyte solution for a rechargeable battery.

The separator is required to have a porous structure allowing lithium ions to pass therethrough and also to be insoluble into and stable to an electrolyte solution. Accordingly, the separator is preferably formed of a non-woven fabric or a material having a micropore structure which is made of glass, polypropylene, or fluorine-containing resin. Alternatively, the separator may be formed of a metal oxide film or a resin film combined with a metal oxide which has a plurality of micropores. In particular, the separator using a metal oxide film having a multi-layered structure is effective to prevent internal-shorts between the anode and cathode because it effectively prevents a dendrite from passing therethrough. The separator can be also formed of an incombustible fluorine-containing resin, glass, or metal oxide film for improving the safety even in the case of the occurrence of such internal-shorts.

(Electrolyte)

An electrolyte in the rechargeable battery of the present invention is a portion through which ions related to the above battery reaction are movable and is held by a separator (such as the separator 103 in FIG. 1). Such an electrolyte is used in the form of:

(1) an appropriate electrolyte as it is;
(2) a solution of the electrolyte dissolved in a solvent; or
(3) a material of the solution having immobilized using a gelatinizing agent such as a polymer.

In general, an electrolyte solution containing an appropriate electrolyte dissolved in a solvent is used in such a manner as to be retained in the separator.

The ionic conductivity of the electrolyte at 25° C. is preferably in a range of $1 \times 10^{-3}$ S/cm or more, more preferably, in a range of from $5 \times 10^{-3}$ S/cm or more.

In the lithium battery using lithium as an anode active material, there can be desirably used the following electrolyte and solvent:

Specific examples of the electrolyte include inorganic acids such as $H_2SO_4$, HCl and $HNO_3$: salts of $Li^+$ (lithium ion) with Lewis acid ion such as $BF_4^-$, $PF_6^-$, $AsF_6^-$, $ClO_4^-$, $CF_3SO_3^-$ or $BPh_4^-$ (with Ph being a phenol group): and mixtures of two or more of the salts. Other than these electrolytes, salts of the above described Lewis acid ions with cations such as sodium ion, potassium ion, tetraalkylammonium ion, or the like are also usable. In any case, it is desired that the above salts are used after they are subjected to dehydration or deoxygenation, for example, by way of heat treatment under a reduced pressure.

Specific examples of the solvent used for the electrolyte include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitromethane, dimethyl sulfide, dimethylsulfoxide, methylformate, 3-methyl-2-oxdazolydinone, 2-methyltetrahydrofuran, 3-propylsydonone, sulfur dioxide, phosphoryl chloride, thionyl chloride, sulfuryl chloride, and mixtures of two or more thereof.

The above solvent may be previously subjected to dehydration using activated alumina, molecular sieve, phosphorous pentaoxide, or calcium chloride, or may be subjected to distillation in an atmosphere composed of an inert gas in the presence of an alkali metal for removing moisture and foreign matters.

In order to prevent leakage of the electrolyte solution, the electrolyte solution is desired to be gelatinized using an appropriate gelatinizing agent. The gelatizing agent can include polymers having a property such that it absorbs the solvent of the electrolyte solution to swell. Specific examples of such a polymer include polyethylene oxide, polyvinyl alcohol, and polyacrylamide.

(Shape and Structure of Battery)

The rechargeable battery of the present invention may be formed in a flat round shape, a cylindrical shape, a prismatic shape, or a sheet-like shape, and it may be of a monolayer type, multi-layered type or a spiral type. The rechargeable battery formed in a spiral-wound cylindrical shape in which the anode and cathode are spiral-wound while putting the separator therebetween, has an advantage that the battery area can be increased and a high electric current is allowed to flow upon conducting the charging and discharging. The rechargeable battery formed in a prismatic shape or a sheet-like shape has an advantage allowing a space of an instrument having a configuration of housing a plurality of batteries to be effectively utilized.

Figure 3:
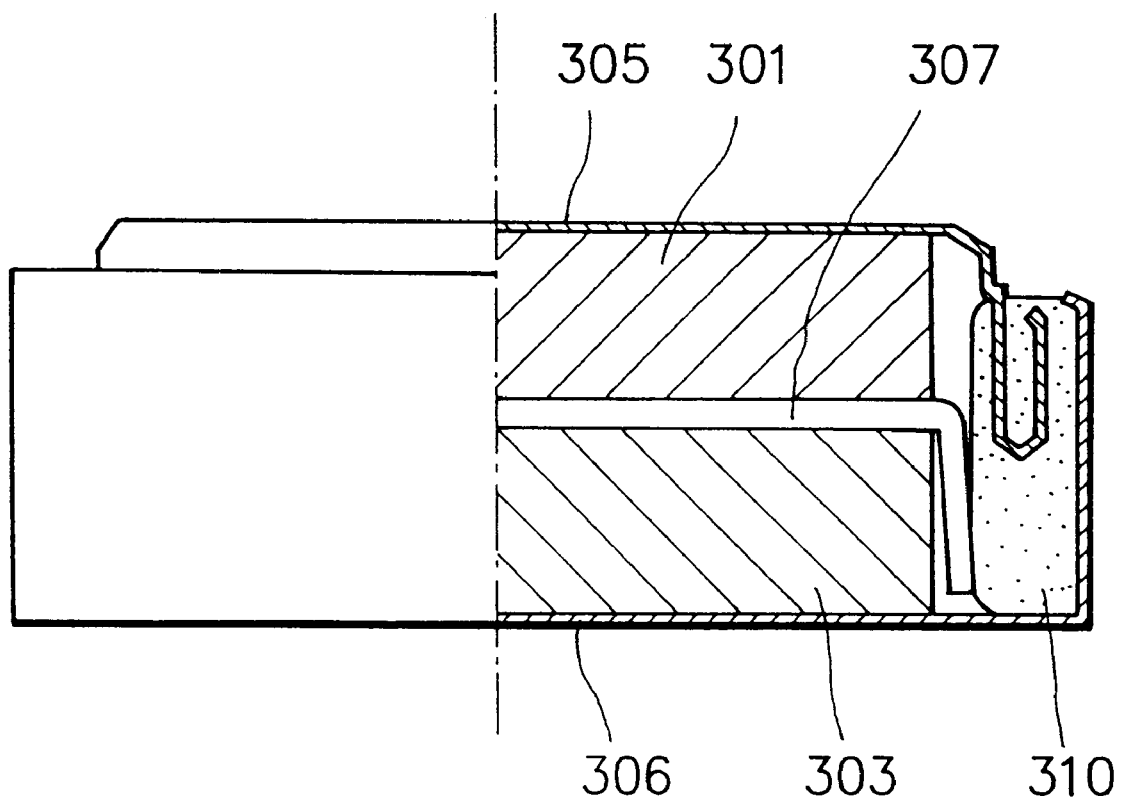
FIG. 3 is a sectional view showing one example of a single-layer flat round battery of the present invention.
Figure 4:
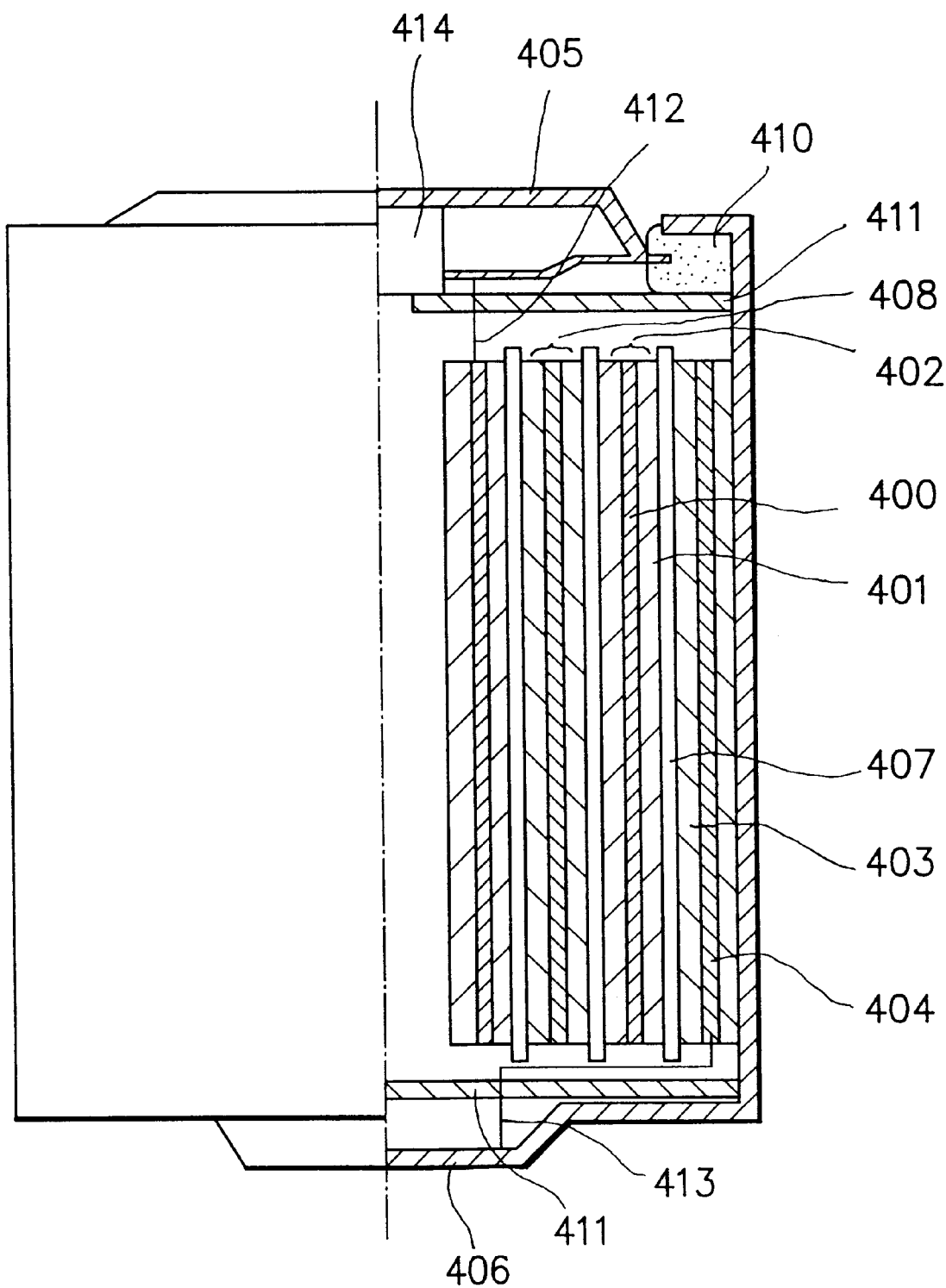
FIG. 4 is a sectional view showing one example of a spiral-wound cylindrical battery of the present invention.

The shape and structure of the battery will be described in detail with reference to FIGS. 3 and 4 below. FIG. 3 is a sectional view of a single-layer flat round (coin shape) battery; and FIG. 4 is a sectional view of a spiral-wound cylindrical battery. Each of these batteries has the same basic configuration as that shown in FIG. 1, that is, it has an anode, cathode, electrolyte, separator, battery housing, and terminals.

In FIGS. 3 and 4, reference numerals 301, 401 indicate anode (active material) layers; 303, 403 are cathode (active material) layers; 305, 405 are anode terminals (anode caps); 306, 406 are cathode terminals (cathode cans); 307, 407 are separators (containing electrolytes); 310, 410 are insulating packings; 400 is an anode collector; 404 is a cathode collector; 411 is an insulating plate; 412 is an anode lead; 413 is a cathode lead; and 414 is a safety vent. In the battery shown in FIG. 4, a cathode 408 is composed of a cathode (active material) layer 403 and the cathode collector 404; and an anode 402 is composed of the anode (active material) layer 401 and the anode collector 400.

In the flat round (coil type) rechargeable battery shown in FIG. 3, the cathode or the cathode (active material) layer 303 including a cathode material layer and the anode or the anode (active material) layer 301 including an anode material layer are stacked via the separator 307 retaining at least an electrolyte solution, and the stacked body is accommodated in the cathode can 306 as the cathode terminal from the cathode side, with the anode side covered with the anode cap 305 as the anode terminal. The insulating packing 310 is disposed in the remaining space of the cathode can.

In the spiral-wound cylindrical rechargeable battery shown in FIG. 4, the cathode 408 having the cathode (active material) layer 403 formed on the cathode collector 404 and the anode 402 having the anode (active material) layer 401 formed on the anode collector 400 are opposed to each other via the separator 407 retaining at least the electrolyte solution, and wound to form a stacked body of a multi-wound cylindrical structure. The stacked body of the cylindrical structure is accommodated in the cathode can 406 as the cathode terminal. The anode cap 405 as the anode terminal is provided on the opening side of the cathode can 406, and the insulating packing 410 is disposed in the remaining space of the cathode can. The electrode stacked body of the cylindrical structure is apart from the anode cap side via the insulating plate 411. The anode 402 is connected to the anode cap 405 via the cathode lead 412, and the cathode 408 is connected to the cathode can 406 via the cathode lead 413. The safety vent 414 for adjusting the internal pressure of the battery is provided on the anode cap side.

One example of a process of assembling the battery shown in FIG. 3 or 4 will be described below.

(1) A combination including the separator (307, 407) interposed between the anode (active material) layer (301, 401) and the cathode (active material) layer (303, 403) is positioned in the cathode can (306, 406).

(2) The electrolyte is introduced thereinto, and the resultant is assembled with the anode cap (305, 405) and the insulating packing (310, 410).

(3) The assembled body in the procedure (2) is subjected to caulking treatment, to obtain the rechargeable battery.

In addition, the preparation of the materials of the lithium battery and the assembly of the battery are desired to be conducted in a dry air from which water content is adequately removed or in a dry inert gas.

The members used in the examples of the above rechargeable batteries will be described below.

(Insulating Packing)

The insulating packing (310, 410) may be made of a fluorine-containing resin, polyamide resin, polysulfone resin or a rubber material. The sealing of the battery may be conducted by glass-sealing, bonding using an adhesive, welding or soldering, in addition to caulking using the insulating packing shown in FIGS. 3 and 4.

The insulating plate (411) shown in FIG. 4 may be made of a material selected from organic resin materials and ceramics.

(Battery Housing/Cathode Can)

For example, as shown in FIGS. 3 and 4, the battery housing for accommodating respective members in the rechargeable battery of the present invention serves as each electrode terminal, cathode can and anode cap of the battery. In the examples shown in FIGS. 3 and 4, the cathode can (306, 406) and the anode cap (305, 405) constitute the battery housing serving as the input/output terminals. The battery housing serving as the output/input terminals may be formed of a stainless steel sheet Other than the stainless steel sheet, there may be used a titanium clad stainless steel sheet, copper clad stainless steel sheet or nickel plating steel sheet.

In the example shown in FIG. 3, the cathode can 306 serves as the battery housing; and in the example shown in FIG. 4, the cathode can 406 serves as the battery housing; accordingly, they may be formed of the above stainless steel sheet. On the other hand, in the case where the cathode can or anode can does not serve as the battery housing, the battery housing can be made of a material selected from the above stainless steel; metals such as zinc; plastics such as polypropylene; and complex materials such as metal or glass fiber reinforced plastics.

(Safety vent)

In the rechargeable battery of the present invention, a safety vent (the safety vent 414 in FIG. 4) is desired to be provided in order to ensure safety when the internal pressure in the battery is increased. The safety vent can be made of a material selected from rubbers, springs, metal balls or burst foils.

Hereinafter, the present invention will be described in detail with reference to examples, which is for illustrative purposes only and is not intended to limit the scope of the present invention.

EXAMPLE 1

In this example, there was prepared a rechargeable lithium battery having a sectional structure shown in FIG. 3, in which a carbonous material prepared according to the process of the present invention was used as an anode.

A procedure for the production of each component of the battery and an assembling process of the battery will be described with reference to FIG. 3.

(1) Preparation of Carbonous Material for Anode (a) Natural graphite was immersed in a methanol solution of phosphoric acid so as to permeate the phosphoric acid between layers of graphite, with a result that the graphite was swelled. The graphite thus swelled was subjected to irradiation of ultrasonic waves, to cleave the layers of the graphite from each other (b) The resultant graphite was cleaned using a methanol-water mixed solution, and dried under a reduced pressure at 150° C.

(c) The graphite thus dried was ground by a grinder into a powder having a particle size of 2 $\mu$m.

(d) The powdery graphite was dispersed in a 1,2-dichloroethane solution of poly (acenaphthylene), being dried in the air, and was further dried under a reduced pressure at 150° C. The resultant powdery graphite was gradually heated in an argon flow and baked at 700° C., being cooled, and was ground in an argon atmosphere using a grinder, to thereby obtain a powder of a carbonous material.

The powdery carbonous material thus obtained was subjected to X-ray diffraction using CuKα-rays, which gave a result that a sharp peak and a broad peak appeared at points near 2θ=26.5° and 25° based on the (002) face, respectively. The powdery carbonous material was also subjected to elemental analysis, which gave a result that the content of carbon was 97% and the content of hydrogen was about 1%.

(2) Procedure for Preparation of Anode (Active Material) Layer 301

(a) The powdery carbonous material obtained in the procedure (1) was ground by a grinder, and was mixed with 10 wt % of a powder of poly (vinylidene fluoride), followed by the addition of N-methyl-2-pyrrolidone, to prepare a paste-like product.

(b) The paste-like product was applied on a collector formed of a copper foil whose thickness was 2 μm, and was dried under a reduced pressure at 150° C., to prepare an anode (active material) layer. The thickness of the anode material was 90 μm.

(3) Procedure for Preparation of Cathode (Active Material) Layer 303

(a) Electrolytic manganese dioxide and lithium carbonate were mixed at a mol ratio of 1:0.4, followed by heat treatment at 800° C., to prepare a lithium-manganese oxide.

(b) The lithium-manganese oxide was added with 3 wt % of a powder of carbon black (acethylene black) and 5 wt % of a powder of poly (vinylidene fluoride), followed by the addition of N-methyl-2-pyrrolidone, to prepare a paste-like product.

(3) The paste-like product was applied on an aluminum foil as a collector, being dried in the air, and was further dried under a reduced pressure at 150° C., to prepare a cathode (active material) layer 303. In addition, the amount of the cathode active material was adjusted such that the electric capacity thereof is larger than that of the anode active material. The thickness of the cathode material layer was 90 μm.

(4) Procedure for Preparation of Electrolyte Solution 307

(a) Ethylene carbonate (EC) and dimethyl carbonate (DMC) from which water content was adequately removed was mixed at an equivalent mixing ratio, to thereby prepare a solvent.

(b) The solvent was added with 1M (mol/l) of lithium tetrafluoro borate, to prepare an electrolyte solution.

(5) Separator 307

A micropore separator made of polyethylene was used.

(6) Assembly of Battery (a) The separator 307 retaining the electrolyte solution was held between the anode (active material) layer 301 and the cathode (active material) layer 303, and the combination thus obtained was inserted in the cathode can 306 made of a titanium clad stainless steel material.

(b) The cathode can 306 was covered with the insulating packing 310 made of polypropylene and the anode cap 305 made of a titanium clad stainless steel material, followed by caulking, to prepare a rechargeable lithium battery.

(Evaluation of Battery Characteristic)

Description will be made of the evaluation of battery characteristics of the battery thus prepared in terms of the energy density per unit volume of the battery and cycle life which are obtained by the charging/discharging cycle test.

The cycle test is conducted by placing each rechargeable battery in a charging and discharging device HJ-106M (produced by Hokuto Kabishiki Kaisha). In this test, each cycle is set to include charging and discharging alternatively repeated under a condition of 1 C (ELECTRIC current of 1 time the electric capacity per an hour based on the electric capacity calculated from the cathode active material of each rechargeable battery) and the rest time of 30 minutes. The cut-off voltage upon conducting the charging was set at 4.5 V and the cut-off voltage upon conducting the discharging was set at 2.5 V. The charging and discharging cycle test was initiated by conducting the charging. The battery capacity was taken as the service capacity after the third repetition of the charging/discharging and the energy density per unit volume was calculated. The energy density per unit volume was evaluated on the basis of the value of [average operating voltage (V)×discharging electric amount $(Ah)^-$/battery volume (e)]. In addition, the battery volume was calculated as the external volume of the unit cell composed of the anode/separator/cathode. The charging and discharging cycle life is based on the number of the charging and discharging cycle repeated until the battery capacity becomes less than 60% of the initial battery capacity. The charging/discharging efficiency is based on the ratio of the discharging electric amount to the charging electric amount at the third cycle.

Comparative Example 1

This example was different from Example 1 in that a carbonous material prepared in the following manner was used as an anode. In other word, in this example, the carbonous material in Example 1 was not used.

(1) Procedure for Preparation of Carbonous material For Anode (a) Poly (acenaphthylene) was gradually heated in an argon gas flow and was baked at 700° C., being cooled, and was ground by a grinder, to obtain a powder of carbonous material.

From a chart obtained by X-ray diffraction of the powder of carbonous material, it was found that a broad peak appeared at a point near 2θ=25°. Also, from a result of elemental analysis of the powder of carbonous material, it was found that the content of carbon was 95% and the content of hydrogen was 2%.

The other was the same as that in Example 1.

The evaluated performances of the rechargeable lithium batteries prepared in Example 1 and Comparative Example 1 are collectively shown in Table 1. In Table 1, the evaluated results of the cycle life, the charging and discharging efficiency (ratio between discharging electric amount and charging electric amount), and the energy density (discharging capacity) per unit volume of the anode of the battery are compared with each other in such a manner that each value of Example 1 is compared (normalized) with the corresponding value of Comparative Example 1 taken as 1.0.

TABLE 1

|  | Example 1 |
| --- | --- |
| cycle life | 1.2 |
| charging/discharging efficiency | 1.1 |
| energy density | 1.3 |

Accordingly, it becomes apparent that it is possible to realize a rechargeable lithium battery having a prolonged cycle life, increased charging/discharging efficiency, and increased energy density by the use of an anode made of the specified carbonous material prepared in Example 1.

EXAMPLE 2

A rechargeable lithium battery having a sectional structure shown in FIG. 3 was prepared by repeating the procedures of Example 1, except that a carbonous material used for an anode (active material) layer was prepared using polyvinyl alcohol as a source material.

Description will be made of a procedure for the preparation of an anode and a cathode for the battery with reference to FIG. 3.

(1) Procedure for Preparation of Carbonous Material for Anode (a) Natural graphite was immersed in a methanol solution of nitric acid to permeate the nitric acid between layers of the graphite, with a result that graphite was swelled. The graphite thus swelled was subjected to irradiation of ultrasonic waves, to cleave the layers of the graphite from each other.

(b) The resultant graphite was cleaned using a methanol-water mixed solution, and dried in a reduced pressure at 150° C.

(c) The graphite thus dried was ground using a grinder, to prepare a powder of graphite.

(d) The powdery graphite thus obtained, citric acid, and water were mixed in a polyvinyl alcohol, followed by natural drying, and was dried in a reduced pressure at 150° C. The resultant graphite was gradually heated in an argon flow and baked at 800° C., being cooled, and was crushed, to obtain a powder of carbonous material. The powder of carbonous material was introduced in an apparatus generating hydrogen plasma from hydrogen gas by radio frequency discharge, to be thus subjected to hydrogen plasma treatment.

The powder of carbonous material thus obtained in the procedure (d) was subjected to X-ray diffraction, which gave a result that a sharp peak and a broad peak appeared at points near $2\theta=26.5°$ and $2\theta=22-25°$, respectively. Also, from the results of elemental analysis of the powder of carbonous material, it was found that the content of carbon was 94% and the content of hydrogen was 3%.

The results of X-ray photoelectron spectroscopy (XPS) of the powder of carbonous material showed that a carbon-oxygen bonding was formed, and the observation of the powder of carbonous material by an electron microscope showed that a numerous number of pores were formed in the carbonous material.

A rechargeable battery was prepared in the same manner as in Example 1, except that the anode was prepared using such a carbonous material.

Comparative Example 2

A rechargeable battery was prepared by repeating the procedures of Example 2, except that a carbonous material used for the anode active material was prepared only by baking polyvinyl alcohol.

Description will be made of a procedure for the preparation of a carbonous material used for an anode.

(1) Procedure for Preparation of Carbonous material For Anode (a) Polyvinyl alcohol was gradually heated in an argon gas flow and was baked at 800° C., being cooled, and was ground using a grinder, to obtain a powder of carbonous material.

The powder of carbonous material was subjected to X-ray diffraction, which gave a result that a broad peak appeared at a point near $2\theta=24°$. Also, the results of elemental analysis of the powder of carbonous material showed that the content of carbon was 91% and the content of hydrogen was 2%, and the results of X-ray photoelectron spectroscopy (XPS) of the powder of carbonous material showed that a carbon-oxygen bonding was formed.

A rechargeable battery was prepared in the same manner as in Example 1, except that such a carbonous material was used for an anode.

The performances of the rechargeable lithium batteries in Example 2 and Comparative Example 2 were evaluated in the same manner as in Example 1 and Comparative Example 1. The results are collectively shown in Table 2. In Table 2, the evaluated results of the cycle life, the charging and discharging efficiency (ratio between discharging electric amount to charging electric amount), and the energy density (discharging capacity) per unit volume of the anode of the battery are compared with each other in such a manner that each value of Example 2 is compared (normalized) with the corresponding value of Comparative Example 2 taken as 1.0.

TABLE 2

|  | Example 2 |
| --- | --- |
| cycle life | 1.1 |
| charging/discharging efficiency | 1.1 |
| energy density | 1.2 |

Accordingly, it becomes apparent that it is possible to realize a rechargeable lithium battery having a prolonged cycle life, increased charging/discharging efficiency, and increased energy density by the use of an anode made of a specified carbonous material prepared in Example 2.

EXAMPLE 3

A rechargeable lithium battery having a sectional structure shown in FIG. 3 was prepared by repeating the procedures of Example 1, except that a carbonous material used for an anode was prepared using polyacrylonitrile as a source material.

Description will be made of only a procedure for the preparation of a carbonous material for an anode of a battery and the anode.

(1) Procedure for Preparation of Carbonous Material for Anode and Anode (a) A fine powder of graphite was prepared in the following manner. Montmorillonite as a layered clay mineral was dispersed in an aqueous solution of furfuryl alcohol, to replace water molecules in the montmorillonite with furfuryl alcohol. The resultant was added with sulfuric acid, and heated to polymerize furfuryl alcohol in the montmorillonite. The polymerized furfuryl alcohol was dried, and heat-treated at 700° C. The montmorillonite was then dissolved and removed by irradiation of ultrasonic waves in a solution of hydrofluoric acid and hydrochloric acid. The polymerized product was dried under a reduced pressure at 700° C. and baked in an argon flow at 2200° C., to obtain a fine powder of graphite having an average particle size of 0.5 μm.

(b) The fine powder of graphite thus obtained was mixed with polyacrylonitrile, followed by the addition of N-methyl-2-pyrrolidone, to prepare a paste-like product.

(c) The paste-like product was applied on a copper foil (thickness: 2 μm) with the surface roughened by etching, followed by drying in the air, and was gradually heated under a reduced pressure and baked at 750° C., to obtain a copper foil covered with the carbonous material layer whose thickness of 90 μm.

(d) The copper foil covered with the carbonous material layer was subjected to heat treatment in a hydrogen gas flow at 200° C., to reduce the surface of the copper foil oxidized in the procedure (c), whereby preparing an anode.

The carbonous material obtained in the procedure (d) was subjected to X-ray diffraction, which gave a result that a sharp peak and a broad peak appeared at points near 26.4° and 2θ=22–25°, respectively. From the results of elemental analysis of the carbonous material, it was found that the content of carbon was about 83%, the content of hydrogen was 2%, and the content of nitrogen was about 13%.

A rechargeable battery was prepared in the same manner as in Example 1, except that the above carbonous material was used for an anode.

Comparative Example 3

A rechargeable battery was prepared by repeating the procedures of Example 3, except that a carbonous material used for an anode active material layer was prepared only by baking polyacrylonitrile.

Description will be made only of a procedure for the preparation of a carbonous material used for an anode.
(1) Procedure for Preparation of Carbonous Material For Anode (1) Polyacrylonitrile was gradually heated in an argon gas flow and was baked at 750 ° C., being cooled, and was crushed using a crusher, to obtain a powder of carbonous material.

From the results of X-ray diffraction of the powder of carbonous material, it was found that a broad peak appeared at a point near 2θ=25°.

A rechargeable battery was prepared in the same manner as in Example 1, except that such a carbonous material was used as an anode material.

The performances of the rechargeable lithium batteries in Example 3 and Comparative Example 3 were evaluated in the same manner as in Example 1 and Comparative Example 1. The results are collectively shown in Table 3. In Table 3, the evaluated results of the cycle life, the charging and discharging efficiency (ratio between discharging electric amount to charging electric amount), and the energy density (discharging capacity) per unit volume of the anode of the battery are compared with each other in such a manner that each value of Example 3 is compared (normalized) with the corresponding value of Comparative Example 3 taken as 1.0.

TABLE 3

|  | Example 3 |
| --- | --- |
| cycle life | 1.0 |
| charging/discharging efficiency | 1.1 |
| energy density | 1.4 |

Accordingly, it becomes apparent that it is possible to realize a rechargeable lithium battery having a prolonged cycle life, increased charging/discharging efficiency, and increased energy density by the use of an anode made of a specified carbonous material prepared in Example 3.

EXAMPLE 4

A rechargeable lithium battery having a sectional structure shown in FIG. 3 was prepared by repeating the procedures of Example 1, except that a carbonous material used for an anode was prepared using poly (paraphenylene sulfide) as a source material.

Description will be made of a procedure for the preparation of a carbonous material for an anode.
(1) Procedure for Preparation of Carbonous Material for Anode (a) Natural graphite was immersed in a methanol solution of nitric acid, to permeate the nitric acid between layers of the graphite, with a result that graphite was swelled. The graphite thus swelled was subjected to irradiation of ultrasonic waves, to cleave the layers of the graphite from each other.

(b) The resultant graphite was cleaned using a methanol-water mixed solution, and dried in a reduced pressure at 150° C.

(c) The graphite thus dried was ground using a grinder, to prepare a powder of graphite.

(d) The powdery graphite was mixed in poly (paraphenylene sulfide), followed by the addition of α-chloronaphthalene, to prepare a paste-like product. The resultant paste-like product was dried in the air and further dried in a reduced pressure at 100° C., and gradually heated in an argon flow and baked at 800° C., being cooled, and was ground to thereby obtain a powder of carbonous material.

The powder of carbonous material thus obtained was subjected to X-ray diffraction, which gave a result that a sharp peak and a broad peak appeared at points near 2θ=26.5° and 2θ=22–23°, respectively. From the results of elemental analysis of the powder of carbonous material, it was found that the content of carbon was 89%, the content of hydrogen was 1%, and the content of sulfur was about 7%.

A rechargeable battery was prepared in the same manner as in Example 1, except that such carbon powder was used as an anode material.

Comparative Example 4

A rechargeable battery was prepared by repeating the procedures of Example 4, except that a carbonous material for an anode (active material) layer was prepared only by baking poly (paraphenylene sulfide).

Description will be made of a procedure for the preparation of a carbonous material for an anode.
(1) Procedure for Preparation of Carbonous Material For Anode (1) Poly (paraphenylene sulfide) was gradually heated in an argon gas flow and was baked at 800° C., being cooled, and was ground using a grinder, to obtain a powder of carbonous material.

The powder of carbonous material was subjected to X-ray diffraction, which gave a result that a broad peak appeared at a point near 2θ=22–23°. From the results of elemental analysis of the powder of carbonous material, it was found that the content of carbon was 81%, the content of hydrogen was 1%, and the content of sulfur was about 8%.

A rechargeable battery was prepared in the same manner as in Example, except that such a carbonous material was used as an anode material.

The performances of the rechargeable lithium batteries in Example 4 and Comparative Example 4 were evaluated in the same manner as in Example 1 and Comparative Example 1. The results are collectively shown in Table 4. In Table 4, the evaluated results of the cycle life, the charging and discharging efficiency (ratio between discharging electric amount to charging electric amount), and the energy density (discharging capacity) per unit volume of the anode of the battery are compared with each other in such a manner that each value of Example 4 is compared (normalized) with the corresponding value of Comparative Example 4 taken as 1.0.

TABLE 4

|  | Example 4 |
| --- | --- |
| cycle life | 1.2 |
| charging/discharging efficiency | 1.1 |
| energy density | 1.3 |

Accordingly, it becomes apparent that it is possible to realize a rechargeable lithium battery having a prolonged cycle life, increased charging/discharging efficiency, and increased energy density by the use of an anode made of a specified carbonous material prepared in Example 4.

Comparative Example 5

A rechargeable battery was prepared by repeating the procedures of Example 1, except that natural graphite was used as a carbonous material for an anode.

(1) Carbonous Material for Anode

A powder of natural graphite was used as a carbonous material as it is. From the results of X-ray diffraction of the powdery graphite, it was found that a sharp peak appeared at a point near 26.5°.

(2) Procedure for Preparation of Anode (Active Material) Layer 301

(a) The natural graphite was mixed with 10 wt % of a powder of poly (vinylidene fluoride), followed by the addition of N-methyl-2-pyrrolidone, to prepare a paste-like product.

(b) The paste-like product was applied on the surface of a collector made of a copper foil, and dried under a reduced pressure at 150° C., to prepare an anode (active material) layer 301.

A rechargeable battery was prepared in the same manner as in Example 1, except that the carbonous material was used as an anode material.

The performances of the rechargeable lithium battery in Comparative Example 5 were evaluated in the same manner as in Example 1. The results are collectively shown in Table 5. In Table 5, the evaluated results of the cycle life, the charging and discharging efficiency (ratio between discharging electric amount to charging electric amount), and the energy density (discharging capacity) per unit volume of the anode of the battery are compared with each other in such a manner that each value of Example 1 is compared (normalized) with the corresponding value of Comparative Example 5 taken as 1.0.

TABLE 5

|  | Example 1 |
| --- | --- |
| cycle life | 1.2 |
| charging/discharging efficiency | 1.0 |
| energy density | 1.4 |

Accordingly, it becomes apparent that it is possible to realize a rechargeable lithium battery having a prolonged cycle life, increased charging/discharging efficiency, and increased energy density by the use of an anode made of a specified carbonous material in Example 1.

Although a lithium-manganese oxide has been used as a cathode active material for evaluating the performances of the anode in Examples 1 to 4, the present invention is not limited thereto. For example, there may be used a lithium-nickel oxide, lithium-cobalt oxide, and lithium-vanadium oxide as a cathode active material.

In addition, although one kind of the electrolyte solution has been used in Examples 1 to 4, the present invention is not limited thereto.

As described above, according to the present invention, there can be provided a rechargeable battery utilizing intercalating and deintercalating reactions of lithium ions as charging and discharging reactions of the battery, wherein an anode is made of a specified carbonous material containing a crystalline portion in which a graphite structure is developed and an amorphous portion in which the graphite portion is not developed, thereby enabling the battery to have an increased electric capacity, prolonged cycle life, and enhanced charging/discharging efficiency.

What is claimed is:

1. A rechargeable battery comprising an anode, a separator, a cathode, an electrolyte, and a battery housing accommodating said members, said battery being of a type utilizing intercalating and deintercalating reactions of lithium ions as charging and discharging reactions of said battery, wherein said anode comprises a host material for allowing lithium ions to intercalate therein upon charging, and said host material comprises a carbonous material containing a crystalline portion in which a graphite structure is present and an amorphous portion in which no graphite structure is present, the crystalline portion and the amorphous portion of said carbonous material exhibiting two or more peaks in a region of $2\theta=22°-27°$ based on the (002) face on a chart obtained by X-ray wide angle diffraction using CuKα-rays.

2. A rechargeable battery according to claim 1, wherein said host material comprises a powdery carbonous material whose chart of the X-ray diffraction has the diffraction line of the (002) face of a crystalline portion in which a graphite structure is present being a peak having a half value width of 2° or less in a range of 25.7° to 26.7°, and the diffraction line of the (002) face of an amorphous portion in which no graphite structure is present being a peak having a half value width of 8° or more at a point near $2\theta=22°$ to 25°.

3. A rechargeable battery according to claim 1, wherein said host material comprises a powdery carbonous material whose chart of the Raman scattering spectrum has a peak due to graphite structure in a range of 1580 to 1590 cm$^{-1}$ and a peak due to amorphous carbon in a range of 1340 to 1360 cm$^{-1}$.

4. A rechargeable battery according to claim 1, wherein said carbonous material constituting said anode contains carbon in an amount of from 70 to 99 wt %.

5. A rechargeable battery according to claim 1, wherein said carbonous material constituting said anode contains one or more kinds of elements selected from the group consisting of oxygen, nitrogen, hydrogen, and sulfur elements.

6. A rechargeable battery according to claim 1, wherein said carbonous material constituting said anode is obtained by at least dispersing a powder of graphite having an average particle size of from 0.1 to 10 μm in an organic polymer material, and baking said organic polymer material in an inert gas or under a reduced pressure at a temperature of from 600 to 1500° C. to carbonize said organic polymer material containing said graphite.

7. A rechargeable battery according to claim 1, wherein said carbonous material constituting said anode is obtained by at least dispersing a powder of graphite having an average particle size of from 0.1 to 10 μm in a solution of a monomer as a source material of an organic polymer material, polymerizing said monomer, baking an organic polymer material thus obtained in an inert gas or under a reduced pressure at a temperature of from 600 to 1500° C. to carbonize said organic polymer material containing said graphite.

8. A rechargeable battery according to claim 6, wherein said powder of graphite is obtained by mixing graphite with a compound for forming an intercalation compound with graphite, swelling said graphite by reaction therebetween, and irradiating an energy to said graphite to cleave said graphite.

9. A rechargeable battery according to claim 8, wherein said compound for forming an intercalation compound with said graphite comprises an acid, a halogen element, or a metal halide.

10. A rechargeable battery according to claim 7, wherein said powder of graphite is obtained by mixing graphite with a compound for forming an intercalation compound with graphite, swelling said graphite by reaction therebetween, and irradiating an energy to said graphite to cleave said graphite.

11. A rechargeable battery according to claim 10, wherein said compound for forming an intercalation compound with said graphite comprises an acid, a halogen element, or a metal halide.

12. A rechargeable battery according to claim 6, wherein said carbonous material is obtained by adding a material capable of generating $CO_2$ gas by thermal decomposition into said organic polymer material at least dispersed with said graphite, and baking said organic polymer material to carbonize said organic polymer material containing said graphite.

13. A rechargeable battery according to claim 12, wherein said material capable of generating $CO_2$ gas comprises one or more kinds of carboxylic acids selected from the group consisting of citric acid and oxalic acid.

14. A rechargeable battery according to claim 7, wherein said carbonous material is obtained by adding a material capable of generating $CO_2$ gas by thermal decomposition into said organic polymer material obtained by polymerization of said monomer at least dispersed with said graphite, and baking said organic polymer material to carbonize said organic polymer material containing said graphite.

15. A rechargeable battery according to claim 14, wherein said material capable of generating $CO_2$ gas comprises one or more kinds of carboxylic acids selected from the group consisting of citric acid and oxalic acid.

16. A rechargeable battery according to claim 1, wherein said battery is a flat round battery.

17. A rechargeable battery according to claim 1, wherein said battery is a spiral-wound cylindrical battery in which a stacked body obtained by stacking said cathode and said anode via said separator is spiral-wound, to form cylindrical structure, and said structure is accommodated in said battery housing.

18. A process for the production of a rechargeable battery comprising an anode, a separator, a cathode, an electrolyte, and a battery housing for accommodating said members, said battery being of a type utilizing intercalating and deintercalating reactions of lithium ions as charging and discharging reactions of said battery, said process including a step of preparing said anode by shaping a carbonous material obtained by at least dispersing a powder of graphite having an average particle size of from 0.1 to 10 μm in an organic polymer material, and baking said organic polymer material in an inert gas or under a reduced pressure at a temperature of from 600 to 1500° C. to carbonize said organic polymer material containing said graphite.

19. A process for the production of a rechargeable battery according to claim 18, wherein said powder of graphite is obtained by mixing graphite with a compound for forming an intercalation compound with graphite, swelling said graphite by reaction therebetween, and irradiating an energy to said graphite to cleave said graphite.

20. A process for the production of a rechargeable battery according to claim 18, wherein said carbonous material is obtained by adding a material capable of generating $CO_2$ gas by thermal decomposition into said organic polymer material at least dispersed with said graphite, and baking said organic polymer material to carbonize said organic polymer material containing said graphite.

21. A process for the production of a rechargeable battery comprising an anode, a separator, a cathode, an electrolyte, and a battery housing for accommodating said members, said battery being of a type utilizing intercalating and deintercalating reactions of lithium ions as charging and discharging reactions of said battery, said process including a step of preparing said anode by shading a carbonous material obtained by at least dispersing a powder of graphite having an average particle size of from 0.1 to 10 μm in a solution of a monomer as a source material of an organic polymer material, wherein said powder of graphite is obtained by mixing graphite with a compound for forming an intercalation compound with graphite, swelling said graphite by reaction therebetween, and irradiating an energy to said graphite to cleave said graphite;

polymerizing said monomer; and baking an organic polymer material thus obtained in an inert gas or under a reduced pressure at a temperature of from 600 to 1500° C. to carbonize said organic polymer material containing said graphite.

22. A process for the production of a rechargeable battery according to claim 21, wherein said carbonous material is obtained by adding a material capable of generating $CO_2$ gas by thermal decomposition into said organic polymer material at least dispersed with said graphite, and baking said organic polymer material to carbonize said organic polymer material containing said graphite.

23. A process for preparing a carbonous material, said process comprising the steps of:

dispersing a powder of graphite having an average particle size of from 0.1 to 10 μm in an organic polymer material, wherein said powder of graphite is obtained by mixing graphite with a compound for forming an intercalation compound with graphite, swelling said graphite by reaction therebetween, and irradiating an energy to said graphite to cleave said graphite; and baking said organic polymer material in an inert gas or under a reduced pressure at a temperature of from 600 to 1500° C. to carbonize said organic polymer material containing said graphite.

24. A process for preparing a carbonous material, said process comprising the steps of:

dispersing a powder of graphite having an average particle size of from 0.1 to 10 μm in a solution of a monomer as a source material of an organic polymer material, wherein said powder of graphite is obtained by mixing graphite with a compound for forming an intercalation compound with graphite, swelling said graphite by reaction therebetween, and irradiating an energy to said graphite to cleave said graphite;

polymerizing said monomer; and baking said organic polymer material thus obtained in an inert gas or under a reduced pressure at a temperature of from 600 to 1500° C. to carbonize said organic polymer material containing said graphite.

* * * * *